United States Patent [19]
Wells et al.

[11] Patent Number: 5,189,877
[45] Date of Patent: Mar. 2, 1993

[54] EXHAUST MANIFOLD AIR INJECTOR

[75] Inventors: Carter Wells, Colorado Springs, Colo.; Joseph M. Youngblood, Jr., Grapevine, Tex.

[73] Assignee: Oxy Adder, Inc., Grapevine, Tex.

[21] Appl. No.: 642,843

[22] Filed: Jan. 18, 1991

[51] Int. Cl.$^5$ .................................................. F01N 3/30
[52] U.S. Cl. .................................. 60/293; 137/513.5; 137/516.75; 137/533
[58] Field of Search .......... 60/293; 137/513.5, 516.25, 137/533

[56] References Cited

U.S. PATENT DOCUMENTS

| | | | |
|---|---|---|---|
| 1,993,732 | 3/1935 | Bijur | 137/533 |
| 2,413,653 | 12/1946 | Rataiczak | 137/533 |
| 3,788,071 | 1/1974 | Brewer | 60/293 |
| 3,841,349 | 10/1974 | Todd | 137/513.5 |
| 4,005,710 | 2/1977 | Zeddies | 137/533 |
| 4,099,377 | 7/1978 | Yoshimura | 60/293 |
| 4,633,681 | 1/1987 | Webber | 137/513.5 |

Primary Examiner—Douglas Hart
Attorney, Agent, or Firm—David L. Mossman

[57] ABSTRACT

An air injection device for attachment to the exhaust manifold of an internal combustion engine is described. A one-way or check valve permits air to be drawn into the air injector to the exhaust manifold when the pressure inside is less than atmospheric to allow more complete burn of unconsumed fuel. On the pressure stroke, the valve closes and prevents untreated exhaust gases from exiting the injector. The valve is designed with mechanisms, such as small protrusions, on the valve and/or on the seat or circumferences that the valve contacts to reduce or prevent sticking of the valve. In one embodiment, the valve may be spherical, and in another embodiment, the air injector may be provided with a mechanism to manually adjust the air flow through the injector.

19 Claims, 3 Drawing Sheets

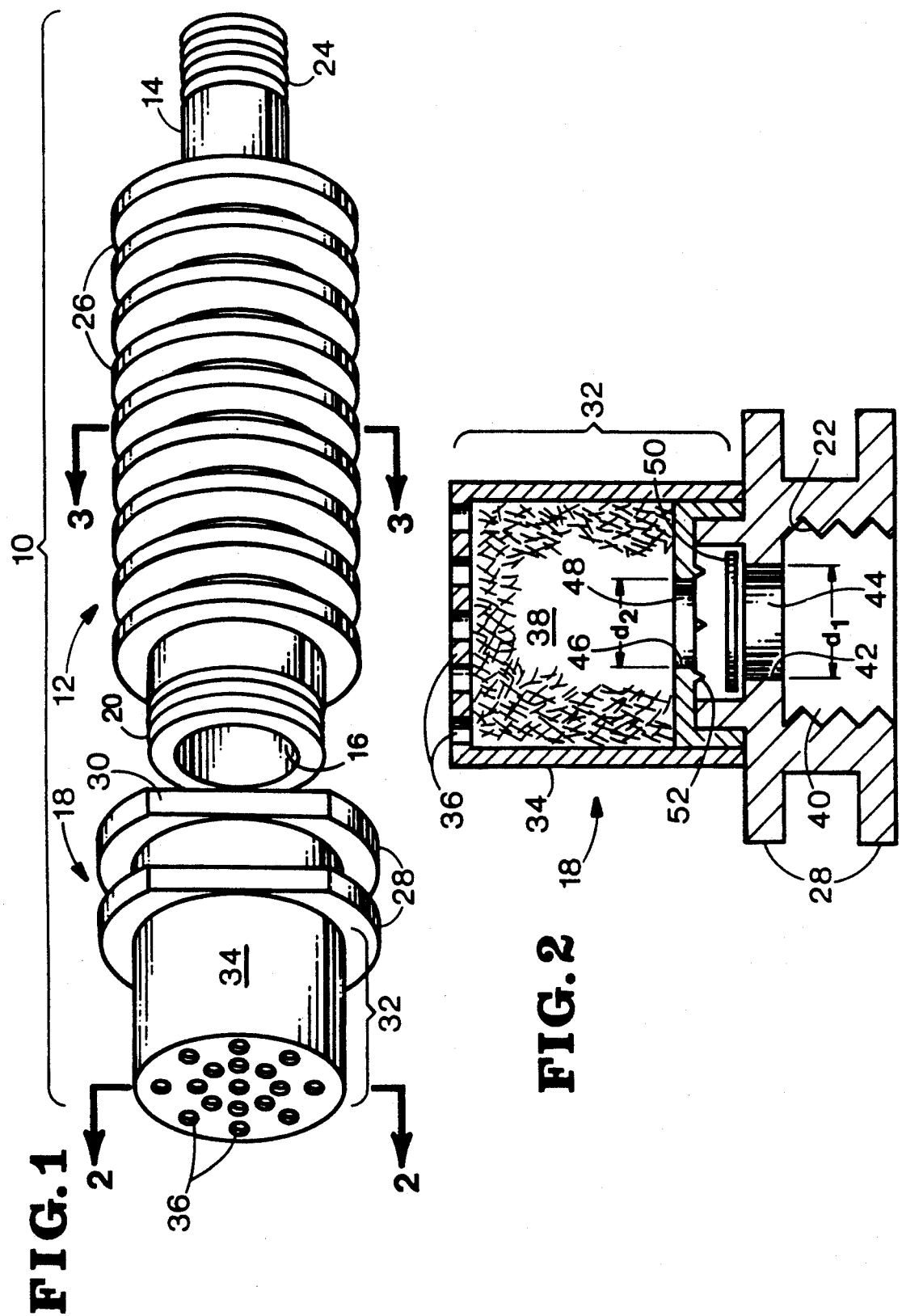

EXHAUST MANIFOLD AIR INJECTOR

FIELD OF THE INVENTION

The invention relates to devices for permitting the introduction of air into the exhaust manifold of a vehicle, and more particularly relates, in one aspect, to exhaust manifold air injectors with mechanisms for preventing a valve within the injector from sticking in position.

BACKGROUND OF THE INVENTION

During the operation of internal combustion engines, including diesel engines, gases resulting from an explosion in the cylinders of the engine are expelled from the cylinder in an initial high pressure pulse or wave. It has been determined that the initial high pressure wave or pulse has a relatively long duration, and is followed by a series of alternating low and high pressure waves of shorter duration. A series of alternating high and low pressure waves is formed in the exhaust manifold each time an exhaust valve for any one of a plurality of engine cylinders is opened. During the high pressure pulses, combustion products or exhaust gases are expelled from the cylinders of the engine. These exhaust gases often contain appreciable amounts of unburned fuel. However, during the low pressure pulses, the pressure inside the exhaust manifold falls below atmospheric and a vacuum is created.

The quantity of unburned fuel in the exhaust gases which are introduced into the exhaust manifold during a high pressure pulse or wave can be substantially reduced by inducting air into the exhaust manifold during the low pressure pulse. The induced air promotes more complete fuel combustion in the manner of an afterburner. Such an air injector thus serves as a mechanical emission control device. Experience has even shown that the inducted or injected air actually helps clean up the carbon deposits in an internal combustion engine.

In other words, the oxygen induced or injected into the hot gases of the exhaust manifold produces a more complete burn of the unoxidized gasoline or diesel fuel in the exhaust manifold. The injection of fresh air, including oxygen, into the exhaust manifold produces a more complete burn and reaction of exhaust gases and fuel within the exhaust manifold itself. In a diesel engine, this produces a better burn of the sulfur contained in the diesel fuel oil and a reduction of particulates which are conventionally vented out the exhaust stack. In a gasoline engine, the injection of air at this point results in a substantial reduction of the carbon monoxide and unburned hydrocarbons found in the the exhaust emissions of an internal combustion engine.

A number of devices have been developed to use the principle described above. For example, U.S. Pat. No. 2,345,569 teaches an atmospheric air vent in the exhaust manifold adjacent the cylinders, which vent has a check valve without substantial inertia in the vent which valve is responsive to alternating vacuum and pressure within the manifold. The valve is a very thin, light metal plate that is not permitted to rotate about its axis. It has been found that a problem with many of these prior devices is that the valve has its motion limited in some way, as here, that the valve may be subject to sticking in an open or closed or even intermediate position thereby voiding its effectiveness.

An air intake check valve connected to the exhaust system is described in U.S. Pat. No. 2,854,816. The check valve has a movable, dome-shaped valve element for opening and closing the valve in step and in phase with the negative and positive half-cycles of the sonic pressure wave in the exhaust system, so as to cause intake of air during the negative half-cycles and resulting reduction in the amplitude of the negative half-cycles, thereby superimposing on the sonic pressure wave a second harmonic, yielding a complex resultant wave characterized by peaked positive pressure half-cycles and flattened negative pressure half-cycles. The movable valve element is frequency responsive to the complex resultant wave to open and close during and by virture of the flattened negative pressure half-cycle and to remain closed during the peaked positive pressure half-cycle. Air charges admitted during the negative pressure half-cycles of the sonic wave react with unburned fuel in the exhaust system during and by virtue of the peaked positive pressure half-cycles of the sonic wave.

U.S. Pat. No. 3,253,401 to Carter Wells discusses an air injector for an internal combustion engine exhaust manifold consisting of a tube with threaded opposite ends in combination with a series of baffle plates disposed in spaced relation in the tube. Each of the baffle plates are in a plane extending substantially diametrically of the tube and each of the plates have an aperture disposed on a side of the axis of the tube opposite the aperture in an adjacent baffle plate. Each baffle plate is spaced from an adjacent baffle plate to provide an air turbulating space. The baffles are to rarefy the exhaust gases as they progress toward the more remote or outer end of the tube. The flutter valve of this device is spring biased closed.

An exhaust manifold afterburner having an elongated reed valve with relatively stationary ends is taught in U.S. Pat. No. 3,314,230. The air injection device of this patent has a body containing an air passage with an air discharge terminal adapted for connection to the exhaust manifold and an air inlet spaced from the terminal. A control mechanism including the valve is carried by the body to control air flow through the body passage to the exhaust manifold in response to exhaust pressure fluctuations communicable to the valve. The reed valve is carried at the downstream side of a seat in such overlying relation thereto to flex away from and toward the seat to control air flow therethrough in response to exhaust pressure fluctuations. The seat projects downstream within the body to pass air therethrough and the body passage extends at the outer side of the seat to receive air flowing laterally between the reed valve and the seat when the reed is flexed away from the seat. The body is also flanged to closely support opposite end portions of the reed valve transversely outwardly of the seat, and in such a manner that the reed valve is free to rotate about an axis defined by the passage during valve flexing. Although this reed valve can rotate about its axis, sticking of the valve against the seat and the flange may still occur, further frustrating the purpose of the device. Valve sticking to the seat and flange surfaces is most likely to occur after the engine is idle for some time and the deposits on the surfaces adhere to each other.

U.S. Pat. No. 3,844,260 mentions an exhaust gas recirculating mechanism for reducing the pollutants discharged from an internal combustion engine by regulating the flow of a portion of the exhaust gases from the exhaust manifold to the intake manifold by the use of a plate valve mechanism that meters the flow of exhaust gases and/or ambient air in response to atmospheric pressure, intake manifold pressure and exhaust manifold pressure. In one form, a single plate valve is provided in the exhaust gas recirculating valve, and in a second form, dual plate valves are used. Included with the ambient air and exhaust gas recirculating mechanism is a velocity nozzle for introducing the gases into the intake manifold and for helping to scavenge the PCV system's crank case emissions. This rather complicated system may give good results if functioning properly, but the use of two plate valves instead of one doubles the possibility that the plates will encounter sticking problems in prolonged operation.

An internal combustion engine having, in communication with the exhaust system at a position where changes in exhaust gas pressure occur during running of the engine a valve constructed and arranged so that when the pressure in the exhaust system is subatmospheric the valve takes up an open condition to admit air into the exhaust system is described in U.S. Pat. No. 3,913,322. Further, when the pressure in the exhaust system is super-atmospheric, the valve takes up an at least partially closed condition so that at least some of the air admitted to the exhaust system through the valve will be drawn back into the engine cylinders. The valve is a free-floating metal disc valve having a plurality of various sized holes therein, but which may still be subject to the sticking problems described earlier.

Finally, there is known the assembly for mounting on an exhaust manifold of an internal combustion engine to induct air into the exhaust manifold during the low pressure portion of the exhaust pulses of the engine discussed in U.S. Pat. No. 4,815,284. The assembly includes a stem section adapted to be connected to the exhaust manifold which includes a stem passage. A hollow cylindrical member is connected to the stem section to form a valve chamber which houses an improved valve arrangement. The valve arrangement includes a coiled spring which extends into the valve chamber, a valve seat, and a valve member disc disposed between the coiled spring and the valve seat. The disc is supported by the coiled spring which urges the disc against the valve seat for closing the valve in the absence of manifold pressure. During the negative pressure portions of the exhaust pulse waves, the disc is displaced away from the valve seat for opening the valve and inducting air into the manifold. During the positive pressure portions of the exhaust pulse waves, the disc is displaced toward and seats against the valve seat for closing the valve. The assembly further includes a pump mechanism extending over the valve chamber for pumping air into the opened valve during the negative pressure portions of the exhaust pulse waves. In one embodiment of this device, three valve members are used, which triples the conventional risk of sticking. Sticking is also aggravated by the spring biasing of this structure which increases the likelihood that the valve plates will adhere to their seats and to each other with the aid of deposits, instead of dropping away from the seats when the pressure is reduced.

It would thus be desirable for an air injector to be devised which eliminates or substantially reduces the possibility of the valve mechanism sticking in one position or the other during operation.

SUMMARY OF THE INVENTION

Accordingly, it is an object of the present invention to provide a device for injecting air into an exhaust manifold automatically in coordination with the exhaust gas pressure cycle.

It is another object of the present invention to provide an air injector for an exhaust manifold of an internal combustion engine that has provisions to prevent sticking of the valve in certain positions.

It is yet another object of the invention to provide an exhaust manifold air injector which has a valve design which prevents sticking during operation.

Yet a further object of the invention is to provide an exhaust manifold air inductor having a mechanism for adjusting the amount of air permitted into the inductor and thus into the exhaust manifold.

In carrying out these and other objects of the invention, there is provided, in one form, an air injector for a vehicle engine exhaust manifold having a tubular main body with an exterior surface and an interior bore and a valve chamber in communication with the interior bore of the tubular main body. The valve chamber has a first circumference edge defining a first opening, the first opening directed toward the tubular main body; a second circumference edge defining a second opening, the second opening directed away from the tubular main body; a valve mechanism for permitting air to travel into the tubular main body, the valve mechanism being free to move between the first circumference edge and the second circumference edge, such that when the valve mechanism is against the second circumference edge a seal is formed that substantially blocks air, and when the valve mechanism is against the first circumference edge air is permitted to flow around the valve. The valve chamber also has a mechanism, such as small protrusions, adjacent at least one of the circumference edges or on the valve mechanism itself for preventing the valve mechanism from sticking to the circumference edges.

BRIEF DESCRIPTION OF THE DRAWINGS

FIG. 1 is an exploded, perspective view of one embodiment of the exhaust manifold air injector of the invention;

FIG. 2 is a detailed, enlarged section view of the valve chamber of the air injector, taken along lines 2—2 of FIG. 1;

Figure 3:
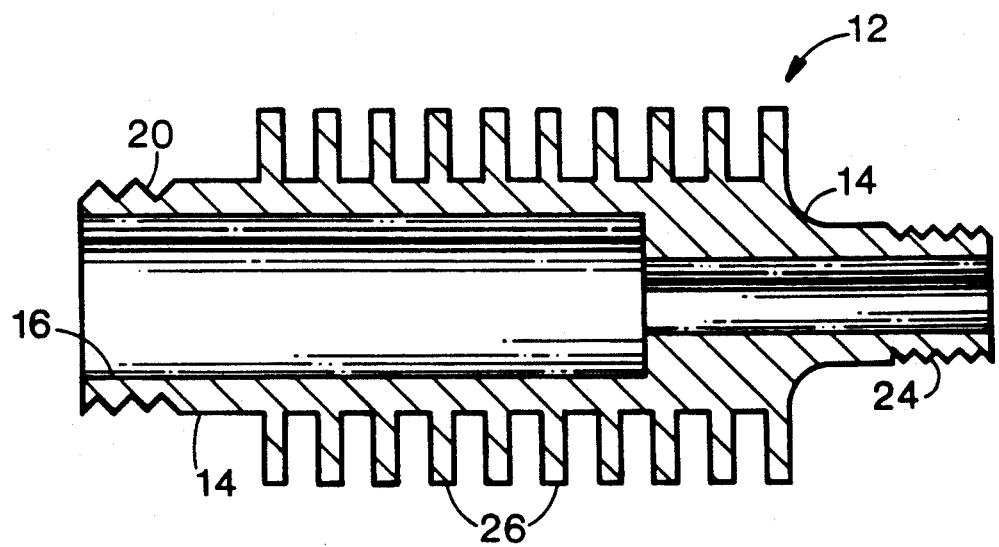
FIG. 3 is a section view of the tubular main body of the air injector, taken along lines 3—3 of FIG. 1.

It will be appreciated that in some of the Figures the various elements and portions of the air injector are not to scale relative to one another, so that certain details may be enlarged for clarity. It will also be appreciated that some of the distances, such as the travel distance of the valve mechanisms in the various aspects may be exaggerated out of proportion with the rest of the structure for clarity.

DETAILED DESCRIPTION OF THE INVENTION

The invention will now be described in more detail with reference to the various Figures. Shown in FIG. 1 is an air injector 10 for attachment or retrofitting to a vehicle engine exhaust manifold (not shown) which injector 10 has a tubular main body 12 with an exterior surface 14 and an interior bore 16 together with a valve chamber 18, which may be a separate item from the tubular main body 12 as shown in FIG. 1 or which alternatively may be integral or one-piece therewith. If chamber 18 and body 12 are separate, male 20 and female 22 screw fittings or other attachment mechanism may be provided for them to be affixed together. Chamber 18 and body 12 may also be press-fit together, in one version. Main body 12 will also have a manifold attachment thread 24 to permit the injector to be removably attached to a fitting (not shown) in the exhaust manifold or directly into a threaded or tapped opening in the exhaust manifold. Tubular main body 12 may also have a plurality of cooling fins 26 along its exterior surface 14 to permit the air within the main body to be cooled to prevent its overheating prior to injection. The tubular main body 12 may be examined in greater, cross-sectional detail in FIG. 3 which is taken at line 3—3 as viewed into the drawing of FIG. 1.

The valve chamber 18 optionally may also be provided with cooling fins 28 which have flats 30 to aid in removal of the chamber 18 from the main body 12, or removal of the air injector 10 itself from the exhaust manifold. The valve chamber 18 may also have an air filter 32 thereon which has a cap 34 with a plurality of holes 36 therein containing suitable cellulose, sponge, synthetic fiber web 38 and the like to filter incoming air. The arrangement or configuration of holes 36 is not critical and is arbitrary. In one embodiment, air filter 32 is made replaceable and/or cleanable, since it will become dirty with use over time. These features may be seen in more detail in FIG. 2 which is taken along line 2—2 viewed going into the FIG. 1 drawing.

Also seen in FIG. 2 is the detail of valve chamber 18, which is enlarged relative to the detail of main body 12 of FIG. 3. It will be appreciated that the interior 40 of valve chamber 18 is in communication with the interior bore 16 of tubular main body 12 so that air can move between the two elements. The valve chamber 18 in its interior 40 has a first circumference edge 42 defining a first opening 44, which is directed toward the main body 12, as well as a second circumference edge 46 defining a second opening 48 opposite first opening 44 away from the tubular main body 12. Throughout this invention, first circumference edge 42 and opening 44 are larger than second circumference edge 46 and opening 48, respectively. This is to facilitate the admission of air into the air injector 10, and in turn the exhaust manifold in one direction, but to prevent the exhaust gases from exiting through the exhaust manifold in the other direction so that the appropriate gases will travel through the exhaust system in the intended manner.

In the particular embodiment of the valve chamber 18 illustrated in FIG. 2, the first circumference edge 42 and second circumference edge 46 define circular openings 44 and 48, respectively, although this shape is not necessary to the functioning of the invention herein. The circular edges and openings may have any shape that may function together with the valve to achieve the desired purpose as will be further described, herein. Valve 50 is encased within interior 40 of the valve chamber 18 and is permitted to travel between first opening 44 and second opening 48. When valve 50 is against the second circumference edge 46, a seal is formed that substantially blocks exhaust from escaping the injector 10 so that exhaust gases travel to the exhaust system (not shown). This occurs automatically when exhaust gas is vented from the cylinders to the exhaust manifold and the pressure inside the main body 12 exceeds atmospheric.

When the cycle reverses and gas is drawn back into the cylinders through the exhaust manifold and the main injector body 12, valve 50 is drawn against first circumference edge 42. The contours of the valve 50 and first circumference edge 42 are to overlap or intersect to permit air to travel around the valve 50 through the second opening 48.

This phenomenon is more readily seen when a possible shape of valve 50 is taken into account. One possible embodiment of valve 50 is more explicitly illustrated in FIG. 4 where valve 50 is a flat flapper plate having a length l, and a width w, where the length l, is longer than the width w is wide. Diameter $d_1$ of first opening 44 (see FIG. 2) is less than length l of flat flapper valve 50 so as to prevent valve 50 from completely exiting first opening 44 and valve chamber 18. However, width w of flat flapper valve 50 is less than diameter $d_1$ of first opening 44 so as to permit atmospheric air to pass around valve 50 through first opening 44 into main body 12 and the exhaust manifold when flapper 50 is against first circumference 42. Yet diameter $d_2$ of second opening 48 is less than width w of flat flapper valve 50 so that a seal is formed when valve 50 is against second circumference 46. In this way, as valve 50 is against second opening 48 no air is passed through the injector 50 when pressure is outward, but air is permitted to travel into the injector 10 (to the right as oriented in FIGS. 1-3) when valve 50 moves to the other, opposite side of valve chamber 18 against first opening 44.

Figure 4:
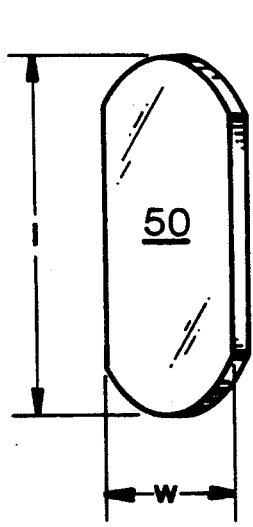
FIG. 4 is a detailed perspective view of one embodiment of the valve mechanism of one aspect of the invention which may be used in the version shown in FIGS. 1-3.

As noted, valve 50 need not have the "flattened circle" shape seen in FIG. 4, but may have other shapes and still perform the same function. For example, the valve 50 may have a square or hexagonal shape and/or grooves or slots cut into it of sufficient depth to prevent the passage of air when against the second opening 48 but to permit air flow therethrough when the valve is against the first opening 44. The flattened circle may be preferred for ease of manufacture in some cases. Similarly, the shape of the circumferences and openings are preferably circles for fabrication simplicity.

Figure 5A:
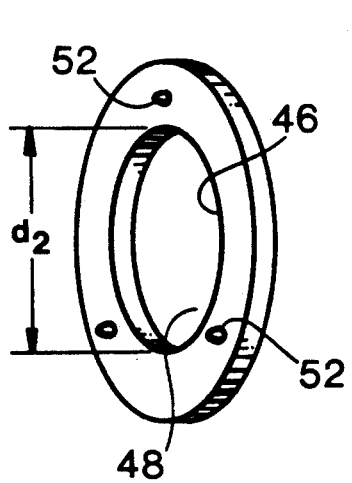
FIG. 5A is a detailed perspective view of the second circumference edge that might be used in the valve chamber shown in FIG. 2 illustrating one aspect of a mechanism for preventing the valve from sticking thereto.
Figure 5B:
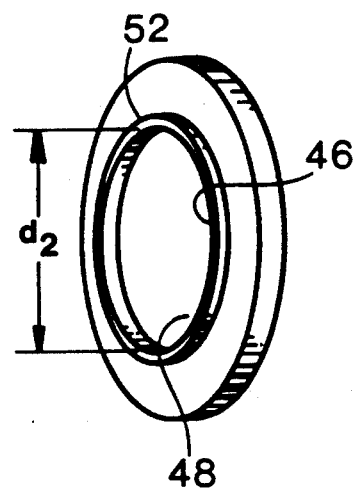
FIG. 5B is another detailed perspective view of an alternative second circumference edge that might be used in the valve chamber shown in FIG. 2 illustrating another aspect of a mechanism for preventing the valve from sticking thereto.

As mentioned above, a concern with prior devices is the sticking of the valve within the chamber. Sticking may occur due to the build-up of deposits on the various interior surfaces of the device. Also since the contact surfaces of the valves and the openings are usually flat and highly machined, the surface tension of moisture and other fluids such as oils which may be within the engine may create forces that stick the valve to these flat contact surfaces. This problem is reduced and/or solved in this invention by the presence of mechanisms adjacent the circumference edges to prevent the valve from sticking thereto. In one embodiment, these mechanisms may be one or more small protrusions 52 around and adjacent to the circumference edges which space the valve 50 therefrom a very small distance. By minimizing surface contact of the valve 50 in this way, sticking is reduced or prevented. It is anticipated that the adherence prevention features 52 may take a variety of forms, not necessarily the small protrusions illustrated in FIGS. 2 and 5A. For example, the features 52 to may be a series of small ridges or ripples along the circumference edges 42 and 46. Feature 52 may also be a single, thin ridge or ring protrusion as shown in FIG. 5B. Also, the adherence prevention features 52 need not be around both circumference edges necessarily, but may be only around the second, smaller circumference edge 46 where the seal is formed and sticking is more likely to occur, though it may be preferred to have them on both surfaces. It is also feasible to have the small protrusions on the valve 50 itself rather than, or in addition to being present near the circumferences. Adherence prevention feature 52 need not be very large, for example, about 1/64", in one non-limiting embodiment.

It will be appreciated that valve 50 is not only free to move back and forth within valve chamber 18, but also is permitted to freely rotate about its axis. This freedom of motion also helps reduce and/or prevent the sticking and adherence problems of prior devices.

Figure 6:
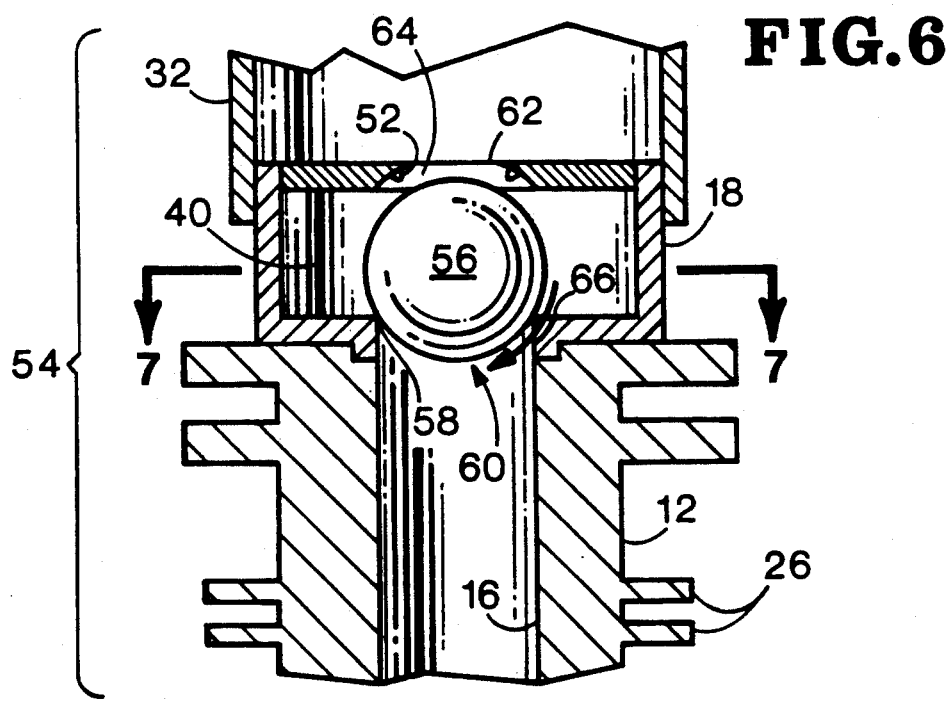
FIG. 6 is a sectional view of an alternate aspect of the air injector of the present invention showing a spherical valve mechanism.
Figure 7:
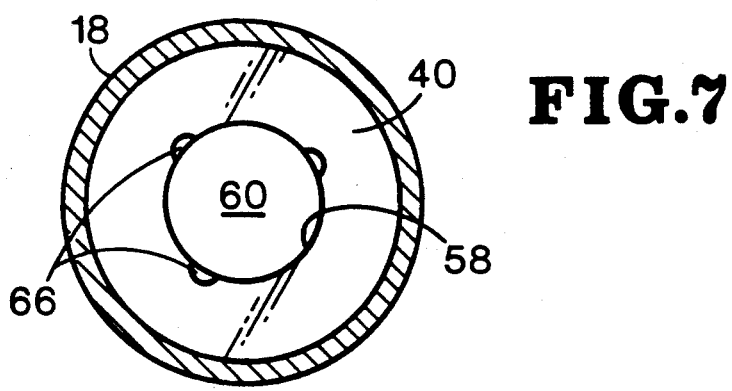
FIG. 7 is a sectional view of the valve chamber from FIG. 6 taken along line 7—7 of FIG. 6 illustrating the shape of the first circumference edge of this embodiment.

Shown in FIG. 6 is an alternate embodiment of the exhaust manifold air injector 54 shown in partial section view in which the valve 56 has the shape of a sphere. The tubular main body 12, valve chamber 18 and air filter 32, and other features are as described above in relation to the embodiment illustrated in FIGS. 1–3. In the embodiment shown in FIG. 6, however, first circumference edge 58 defines dirst opening 60 and second circumference edge 62 defines second opening 64, all of which are circular. As before, second circumference edge 62 and second opening 64 are smaller than first circumference edge 58 and first opening 60. However, it is possible to design this version in such a way that second circumference edge 62 and second opening 64 are larger than first circumference edge 58 and first opening 60, respectively, and still function as intended. When spherical valve 56 is up (as oriented in FIG. 6) against second circumference edge 62, a seal is formed and no air passes through injector 54. When spherical valve 56 is down as shown in FIG. 6, air is permitted to flow through one or more passageways 66 in the direction of the arrow along and within first circumference edge 58. The profile and shape of first circumference edge 58, first opening 60 and passageways 66 may be more clearly seen in the sectional view of FIG. 7 taken along line 7—7 of FIG. 6, where the spherical valve 56 is removed for clarity.

As before, adherence prevention features such as small protrusions 52 may be present adjacent the circumference edges 58 and 62 to hold the valve 56 off therefrom a small distance to prevent or reduce sticking. These protrusions 52 are exaggerated in shape and size in FIG. 6 for clarity. In some embodiments, such protrusions 52 may not be necessary adjacent first circumference edge 58 since the contact surface area is very small.

The use of a spherical valve 56 has a number of advantages. First, by having a spherical contact surface, the contact area with the circumferences 58 and 62 and openings 60 and 64 is minimized. Secondly, the spherical valve 56 is free to spin and rotate in any direction having freedom in this regard, thereby further reducing sticking since as the sphere 56 rotates new surfaces are presented for contact, rather than the same surfaces, diluting the effect of contaminant buildup. Spherical valves are also easy to manufacture.

Although the invention is not limited by the materials of manufacture, it will be appreciated that all parts of the air injector should be made of durable materials or have protective coatings thereon. For example, if the main body 12 were made of a steel which may corrode, it would be advantageous to provide a zinc plating or coating thereover, though other materials may also be protective. In one example, the main body, valve chamber and air filter may be CRS clear zinc plated. The valve itself, the only frequently moving part may be made out of a high-grade steel, engineering plastic or ceramic for long life. Engineering plastics and ceramics are preferred due to their light weight, inertness and tendency not to adhere to the metal circumferences and openings.

In another embodiment of the invention, a mechanism is provided for adjusting the permissible air flow through the air injector. This feature may be useful in employing a standard size of air injector for various purposes. For example, in automobiles with various sized engines, the air flow may be increased on larger cars and reduced on smaller cars. Or the air flow may be adjusted as the device is used to optimize its performance.

Figure 8:
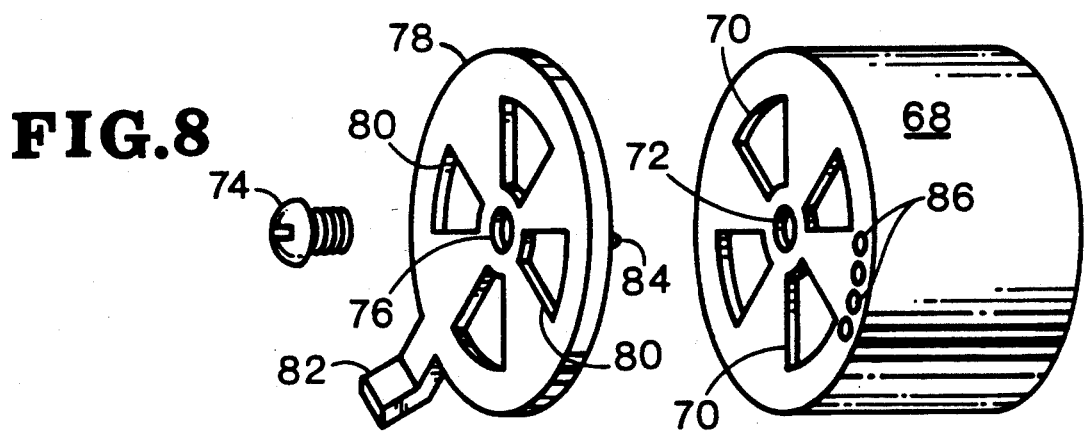
FIG. 8 is a perspective view of one embodiment of a mechanism for regulating the volume of air that may pass through the tubular main body of the air injector that may be adjusted from the outside of the injector by the user.

One way in which this may be accomplished is seen in FIG. 8. Here, the mechanism for adjusting the air volume is integral with the air filter cap 68. The cap is provided with at least one opening 70 therein to permit air to pass therethrough, similar to air admission holes 36 in filter cap 34 of FIGS. 1 and 2. Also provided is an opening 72 to receive the fastening device 74 which is threaded through an opening 76 in regulator plate 78. Since, according to the design illustrated in FIG. 8, both opening 72 is centered in filter cap 68 and opening 76 is centered in regulator plate 78, regulator plate 78 may be oriented concentrically over the surface of air filter cap 68. Regulator plate 78 is also provided with at least one space 80 to permit air to pass therethrough. When space 80 is positioned at least partially over opening 70, air is permitted to pass through air filter cap into the exhaust manifold air injector. It is apparent that the volume of air permitted is regulated by the overlap of space 80 to opening 70. Of course, a plurality of openings 70 and spaces 80 may be used, as illustrated.

The air volume adjustment mechanism should be designed so that fastening device 74 can affix the regulator plate 78 firmly in place on filter cap 34. Regulator plate 78 should not be permitted to rotate freely while the engine is in operation; in part because it may be possible to completely block the air injector and thereby thwart its beneficial action. Regulator plate 78 may be provided with a tab 82 so that when screw 74 is loosened to readjust the overlap and thus regulate the permissible air volume regulator plate 78 may be easily rotated. Plate 78 and cap 68 may be provided with a registration mechanism, one embodiment of which is illustrated in FIG. 8, by pin 84 on the side of regulator plate 78 that faces air filter cap 68 which mates with a plurality of registration holes 86 on the air filter cap 68. Any number of registration mechanisms may be devised to adjust the air flow through the injector in a predictable manner.

Thus, the exhaust manifold air injector of this invention helps oxygenate exhaust gases in diesel and gasoline engines by permitting air to be drawn into the exhaust manifold on a cyclic basis as the exhaust manifold pressure falls below atmospheric. Oxygen induced into the hot gases in the exhaust manifold causes a more complete combustion of unconsumed fuel in the exhaust manifold. In diesel engines this produces a better burn of the sulfur contained in diesel fuel and reduction of the particulates, which are exited through the exhaust stack. In a gasoline engine, this better burn results in a substantial reduction of the carbon monoxide and hydrocarbons found in the exhaust emissions.

The air injector invention may be installed on the exhaust manifold of either a diesel or gasoline engine. The exhaust manifold must be drilled and tapped; then the air injector is screwed into the manifold. A separate fitting attached to the exhaust manifold may also be used. The exact position of installation will vary with the type and design of the engine, of course. On a diesel engine, factors including whether it is an inline or V-design, if it is turbocharged and the location of the turbocharger must be taken into consideration. On a gasoline engine, whether or not it is equipped with factory-installed emission control devices must be factored in. Of course, the air injector should not be installed so as to interfere with these devices. However, if there is no emission control device on the engine as in the case in many countries of the world currently, the air injector is an effective and relatively low cost solution to the problem of how to reduce carbon monoxide and unburned hydrocarbon emissions.

The air injector of this invention has been installed on the exhaust manifolds of diesel engines and particulates and smoke have been reduced. Tests have also shown that the air injector reduces carbon monoxide and unburned hydrocarbon emissions in gasoline engines.

It will be appreciated that many modifications may be made in the exhaust manifold air injector of the invention without departing from the spirit and scope of the invention which are defined only in the appended claims. For example, the shape of the valve, the materials of construction, the method for adjusting the air flow and the mechanism for preventing sticking of the valve may all be modified to optimize the design of the injector or for other reasons as long as the injector functions as described.

We claim:

1. An air injector for a vehicle engine exhaust manifold comprising:
   a tubular main body adapted to be attached to said vehicle engine exhaust manifold having
   an exterior surface;
   an interior bore;
   a valve chamber in communication with the interior bore of the tubular main body; the valve chamber having
   a first circumference edge defining a first opening, the first opening directed toward the tubular main body;
   a second circumference edge defining a second opening, the second opening directed away from the tubular main body;
   a valve means for permitting air to travel into the tubular main body, the valve means being free to move between the first circumference edge and the second circumference edge, such that when the valve means is against the second circumference edge a seal is formed that substantially blocks exhaust, and when the valve means is against the first circumference edge air is permitted to flow around the valve means; and
   means for preventing the valve means from sticking on at least the second circumference edge.

2. The air injector of claim 1 where the valve means is a flat flapper plate having a length and a width, where the length is longer than the width.

3. The air injector of claim 2 where the first and second circumference edges are circular.

4. The air injector of claim 2 where the first circumference edge is circular and has a first diameter, where the second circumference edge is circular and has a second diameter, and where the second diameter is smaller than the width of the flat flapper plate, and where the first diameter is larger than the width, but smaller than the length of the flat flapper plate.

5. The air injector of claim 1 where the valve means is a sphere.

6. The air injector of claim 5 where the second circumference edge is circular and the first circumference edge is roughly circular but cannot seal tightly against the surface of the sphere valve means.

7. The air injector of claim 1 where the valve means comprises a ceramic.

8. The air injector of claim 1 where the means for preventing the valve from sticking are a plurality of protrusions near the circumference.

9. The air injector of claim 1 further comprising means for regulating the volume of air that may pass through the tubular main body, which means for regulating comprises two plates having holes therein adapted to overlap in an adjustable relationship, further comprising means for affixing the plates so that the holes have a fixed overlapping relationship.

10. An air injector for a vehicle engine exhaust manifold comprising:
    a tubular main body adapted to be attached to said vehicle engine exhaust manifold having
    an exterior surface;
    an interior bore;
    a valve chamber in communication with the interior bore of the
    tubular main body; the valve chamber having
    a first circular edge defining a first circular opening, the first circular opening directed toward the tubular main body;
    a second circular edge defining a second circular opening, the second circular opening directed away from the tubular main body, where the first circular edge is larger than the second circular edge;
    a valve means for permitting air to travel into the tubular main body, the valve means being free to move between the first circular edge and the second circular edge, such that when the valve means is against the second circular edge a seal is formed that substantially blocks exhaust, and when the valve means is against the first circular edge air is permitted to flow around the valve means; and at least one protrusion for preventing the valve means from sticking on at least one of the valve means and at least the second circular edge.

11. The air injector of claim 10 where the valve means is a flat flapper plate having a length and a width, where the length is longer than the width.

12. The air injector of claim 11 where the first circumference edge is circular and has a first diameter, where the second circumference edge is circular and has a second diameter, and where the second diameter is smaller than the width of the flat flapper plate, and where the first diameter is larger than the width, but smaller than the length of the flat flapper plate.

13. The air injector of claim 10 where the valve means is a sphere.

14. The air injector of claim 13 where the second circumference edge is circular and the first circumference edge is circular and has passageways therein to permit the passage of air by the sphere.

15. The air injector of claim 10 where the valve means comprises a ceramic.

16. The air injector of claim 10 further comprising means for regulating the volume of air that may pass through the tubular main body, which means for regulating comprises two plates having holes therein adapted to overlap in an adjustable relationship, further comprising means for affixing the plates so that the holes have a fixed overlapping relationship.

17. An air injector for a vehicle engine exhaust manifold comprising:
   a tubular main body adapted to be attached to said vehicle engine exhaust manifold having
      an exterior surface;
      an interior bore;
   a valve chamber in communication with the interior bore of the tubular main body; the valve chamber having
      a first circular edge defining a first circular opening, the first circular opening directed toward the tubular main body, and at least one passageway in the first circular edge;
      a second circular edge defining a second circular opening, the second circular opening directed away from the tubular main body, where the first circular edge is larger than the second circular edge;
      a spherical valve means for permitting air to travel into the tubular main body, the spherical valve means being free to move between the first circular edge and the second circular edge, such that when the spherical valve means is against the second circular edge a seal is formed that substantially blocks exhaust, and when the spherical valve means is against the first circular edge air is permitted to flow through the passageway;
      at least one protrusion for preventing the spherical valve means from sticking on at least one of the spherical valve means and at least the second circular edge; and
   means for regulating the volume of air that may pass through the tubular main body.

18. The air injector of claim 17 where the valve means comprises a ceramic.

19. The air injector of claim 17 where the means for regulating the volume of air comprises two plates having holes therein adapted to overlap in an adjustable relationship, further comprising means for affixing the plates so that the holes have a fixed overlapping relationship.

* * * * *